United States Patent
Lu

(10) Patent No.: US 10,042,800 B2
(45) Date of Patent: Aug. 7, 2018

(54) ACTIVE USB DEVICE AND SWITCHING METHOD FOR OPERATING MODE THEREOF

(71) Applicant: ZTE Corporation, Shenzhen, Guangdong (CN)

(72) Inventor: Xuan Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 582 days.

(21) Appl. No.: 14/412,045

(22) PCT Filed: Jul. 31, 2013

(86) PCT No.: PCT/CN2013/080545
§ 371 (c)(1),
(2) Date: Dec. 30, 2014

(87) PCT Pub. No.: WO2014/026547
PCT Pub. Date: Feb. 20, 2014

(65) Prior Publication Data
US 2015/0169484 A1    Jun. 18, 2015

(30) Foreign Application Priority Data
Aug. 17, 2012  (CN) .......................... 2012 1 0293480

(51) Int. Cl.
*G06F 3/00* (2006.01)
*G06F 13/38* (2006.01)
(Continued)

(52) U.S. Cl.
CPC ........ *G06F 13/385* (2013.01); *G06F 13/4022* (2013.01); *G06F 1/3203* (2013.01);
(Continued)

(58) Field of Classification Search
None
See application file for complete search history.

(56) References Cited

U.S. PATENT DOCUMENTS

| 8,156,271 B2 | 4/2012 | Reece |
| 8,499,104 B2 | 7/2013 | Nie |

(Continued)

FOREIGN PATENT DOCUMENTS

| CN | 101452435 A | 6/2009 |
| CN | 101477498 A | 7/2009 |

(Continued)

OTHER PUBLICATIONS

Supplementary European Search Report in European application No. 13829585.2, dated Jul. 7, 2015.

(Continued)

*Primary Examiner* — Henry Tsai
*Assistant Examiner* — Aurangzeb Hassan
(74) *Attorney, Agent, or Firm* — Oppedahl Patent Law Firm LLC

(57) ABSTRACT

An active USB device and a method for switching an operating mode thereof are provided. In the method, a USB devices is connected to a first host device, and the USB device is in a compound device multi-port mode; the USB device is disconnected from the first host device and the USB devices keeps in the On state; upon detection disconnection of the USB device to the first host device, the USB device switches from the compound device multi-port mode to the single compact disc mode. According to the method for switching the operating mode of the USB device in the disclosure, the USB device can install driver without distinction and completely in various complicated application environments, thereby increasing user experience.

8 Claims, 6 Drawing Sheets

(51) Int. Cl.
*G06F 13/40* (2006.01)
*G06F 1/32* (2006.01)
(52) U.S. Cl.
CPC ........... *G06F 2213/3854* (2013.01); *G06F 2213/4004* (2013.01)

(56) References Cited

U.S. PATENT DOCUMENTS

| | | |
|---|---|---|
| 2003/0046447 A1 | 3/2003 | Kouperchliak |
| 2004/0078505 A1 | 4/2004 | Yu |
| 2007/0005859 A1 | 1/2007 | Diefenbaugh |
| 2009/0037622 A1 | 2/2009 | Dheeresh |
| 2009/0172208 A1* | 7/2009 | Lee ............... G06F 1/1632 710/13 |
| 2011/0185033 A1 | 7/2011 | Reece |
| 2012/0179845 A1* | 7/2012 | Nie ............... G06F 13/102 710/14 |
| 2012/0317325 A1* | 12/2012 | Zhang ............ H04M 1/72527 710/301 |
| 2013/0013818 A1 | 1/2013 | Nie et al. |
| 2013/0191653 A1* | 7/2013 | Shih ............... H01M 10/44 713/300 |

FOREIGN PATENT DOCUMENTS

| | | |
|---|---|---|
| CN | 101609408 A | 12/2009 |
| CN | 101853142 A | 10/2010 |
| CN | 102063320 A | 5/2011 |
| CN | 102103555 A | 6/2011 |
| CN | 102622313 A | 8/2012 |
| CN | 102902518 A | 1/2013 |

OTHER PUBLICATIONS

International Search Report in international application No. PCT/CN2013/080545, dated Oct. 31, 2013.
English Translation of the Written Opinion of the International Search Authority in international application No. PCT/CN2013/080545, dated Oct. 31, 2013.

* cited by examiner

ACTIVE USB DEVICE AND SWITCHING METHOD FOR OPERATING MODE THEREOF

TECHNICAL FIELD

The disclosure relates to wireless communications, and in particular to an active Universal Serial Bus (USB) device and a method for switching operating modes of the active USB device.

BACKGROUND

Many USB-interface based products, such as wireless terminal products, high performance Human Interface Device (HID) products, etc., support automatic installation (or referred to as autorun). The automatic installation function is implemented by simulating a virtual compact disc device for the product to allow users to directly install driver in the virtual compact disc instead of using a physical compact disc that comes with the product, as the users did traditionally.

To implement the function, the USB device must be capable of operating in least two modes, i.e., a single compact disc mode (provided for driver installation or other configuration management software installation) and a normal operating mode (provided for a multi-port compound device to implement different port functions). After a user installs the driver of the USB device which is in the single compact disc mode into a PC, the USB device has to be switched to the operating mode to perform various user functions.

As to USB Modem data card products commonly used in the wireless terminal field, they generally adopt a hardware reset policy when performing the port switching operation. Specifically, when a device receives a Small Computer System Interface (SCSI) instruction from the PC, the device would set a corresponding flag file in its flash space, and the flag file, after being setup, performs a whole board reset function. During initialization of the USB module after the whole board resets, the device is enumerated to a compound device multi-port mode (i.e., normal operating mode) by judging the corresponding flag file.

With rapid development of the wireless terminals, more and more mobile operators and user groups have favored WiFi-enabled Ufi data card products. The Ufi data card products have a battery function module which acts as an independent power supply and thus application environments thereof are much more complex than those of the traditional data card products.

The following conditions may occur when the driver of the Ufi data card product is installed into a PC in a traditional autorun manner: the device is switched to the compound device multi-port mode after the driver is installed at the PC in the single compact disc mode; the user pulls the USB cable and plugs the device which is in an ON state and powered by the battery into another PC in which the driver has not ever been installed; at this time, the device has already been in the compound device multi-port mode and thus the PC has enumerated a plurality of ports to which the driver has not ever been installed, and thus none of the ports can function normally. In this case, the driver cannot be installed normally until the user resets the device and the single compact disc re-report enumeration is completed.

From the perspective of user experience, users cannot bear and accept the above instances, and it is necessary for developers to immediately avoid or solve them.

SUMMARY

Embodiments of the disclosure provide an active USB device and a method for switching the operating mode thereof, such that the USB device can install driver without being reset by a user when it is disconnected from a host device, thus improving user experience.

In view of the above, an embodiment of the disclosure provides a method for switching an operating mode of an active USB device. The method includes the following steps:

when a USB devices is connected to a first host device, causing the USB device to be in a compound device multi-port mode;

when the USB device is disconnected from the first host device, keeping the USB device in an On state; and switching the USB device from the compound device multi-port mode to a single compact disc mode, upon detecting disconnection of the USB device from the first host device.

In an embodiment, the method for switching an operating mode of an active USB device may further include: switching the USB device from the single compact disc mode to the compound device multi-port mode, upon detecting that the USB device is connected to the first host device in which driver has been installed or another host device in which driver has been installed.

In an embodiment, switching the USB device from the compound device multi-port mode to a single compact disc mode may include: performing a USB protocol stack reset function to switch the USB device from the compound device multi-port mode to the single compact disc mode.

In an embodiment, performing a USB protocol stack reset function may include:

acquiring configuration information of the single compact disc mode;

performing, by a USB controller, a disconnection operation;

disabling and reconfiguring function driver FD and an endpoint EP;

re-initializing the function driver FD and the endpoint EP with new configuration;

performing, by the USB controller, a re-connection operation; and performing a callback function.

In an embodiment, switching the USB device from the single compact disc mode to the compound device multi-port mode may include: performing a USB protocol stack reset function to switch the USB device from the single compact disc mode to the compound device multi-port mode.

In an embodiment, switching the USB device from the single compact disc mode to the compound device multi-port mode may include: receiving, by the USB device, a port switching instruction from the first host device or another host device; and resetting the USB device to switch the USB device from the single compact disc mode to the compound device multi-port mode.

In an embodiment, performing a USB protocol stack reset function may include:

acquiring configuration information of the compound device multi-port mode;

performing, by a USB controller, a disconnection operation;

disabling function driver FD and an endpoint EP, reconfiguring the function FD and the endpoint EP;

re-initializing the function driver FD and the endpoint EP with new configuration;

performing, by the USB controller, a re-connection operation; and performing a callback function.

Another embodiment of the disclosure provides an active USB device, including a power supply module, a detection module and a switching module. The power supply module is configured to power the USB device to keep the USB device in an On state, when the USB device is disconnected from the first host device. The detection module is configured to detect whether the USB device is disconnected from the host device. The switching module is configured to switch the USB device from the compound device multi-port mode to a single compact disc mode, upon detecting disconnection of the USB device from the host device.

In an embodiment, the detection module is configured to detect whether the USB device is connected to the first host device or to another host device; and the switching module is configured to judge whether the first host device or the another host device has driver installed therein, when the detection module detects that the USB device is connected to the first host device or the another host device, and switch an operating mode of the USB device from the single compact disc mode to the compound device multi-port mode, when the driver has been installed.

In an embodiment, the switching module is configured to perform a USB protocol stack reset function to switch the USB device from the compound device multi-port mode to the single compact disc mode.

In an embodiment, the USB device may be a WiFi-enabled data card.

According to the active USB device and the method for switching the operating mode thereof in the embodiments of the disclosure, when the USB device is disconnected from the host device, the USB device is switched from the compound device multi-port mode to the single compact disc mode, such that the driver can be installed directly when the USB device is connected to a host device in which the driver has not been installed. Instead of switching the operating mode by device reset, the USB device performs the USB protocol stack reset function to switch the operating mode, which saves the starting time of the USB device, increases the operating efficiency of the USB device and improves user experience.

DETAILED DESCRIPTION

With reference to the accompanying figures, the subject matter of the disclosure will be described in detail in various embodiments.

Embodiment One

Figure 1:
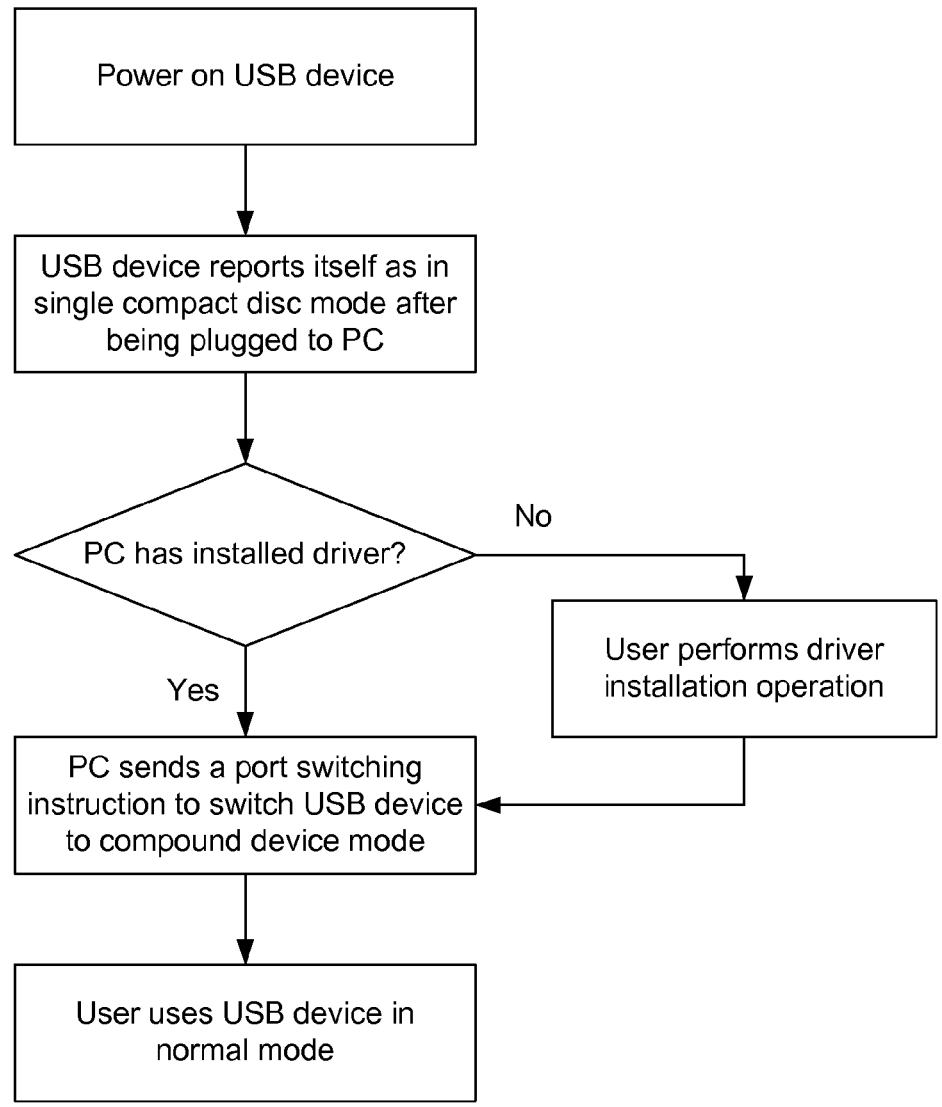
FIG. 1 is a flow chart of reporting switching of a USB port during normal start up of a USB device according to embodiment one of the disclosure.

Specifically, taking a Ufi terminal product as an example, in general cases, regardless of whether a user starts up the product for the first time, the Ufi terminal product involved in the embodiment of the disclosure would normally be enumerated as a single compact disc device. When the device is plugged into a PC via a USB cable, the device would report itself as a single compact disc device (its driver has not ever been installed in the PC) or as a compound device multi-port mode (if the PC has the driver installed therein, the device would be directly switched from the single compact disc mode to the compound device multi-port mode), which is a common process, as shown in FIG. 1.

The switching method in the embodiment includes the following steps:

when a USB devices is connected to a first host device, causing the USB device to be in a compound device multi-port mode;

when the USB device is disconnected from the first host device, keeping the USB device in an On state; and upon detecting disconnection of the USB device from the first host device, switching the USB device from the compound device multi-port mode to a single compact disc mode.

Based on this method, when the USB device which keeps in the On state is disconnected from the first host device, the USB device is switched from the compound device multi-port mode to the single compact disc mode. Generally, when the driver of the USB device is successfully installed into the PC, the USB device would be switched to the compound device multi-port mode under an instruction (SCSI instruction) transmitted by filter driver, such that the user can use the device normally in the mode. When the user pulls the USB cable to disconnect the USB connection in the On state, the USB device would be switched from the compound device multi-port mode back to the single compact disc mode. At this time, if the user plugs the device to another PC in which the driver of the device has not been installed (the PC may be one to which the USB device had been plugged, or another PC), the user may normally use the device after a driver installation operation and the like performed using a compact disc enumerated by the device. The user does not have to reset the device to cause the USB device to enter the single compact disc mode; instead, the user only has to plug the USB device which keeps in the On state to the PC in which the driver has not been installed and then the driver can be installed.

The switching method in the embodiment may further include the following steps: switching the USB device from the single compact disc mode to the compound device multi-port mode, upon detecting that the USB device is connected to the first host device in which driver has been installed or another host device in which driver has been installed.

The USB device is re-connected to the host device to which it had plugged previously or to another host device.

If the host device has the driver installed therein, the USB device is switched from the single compact disc mode to the compound device multi-port mode. When the user pulls the USB cable, the USB device is switched from the compound device multi-port mode to the single compact disc mode. When the user plugs the USB device to a PC in which the driver has been installed, the USB device is switched from the single compact disc mode to the compound device multi-port mode, such that the USB device and the host device can normally operate.

Figure 2:
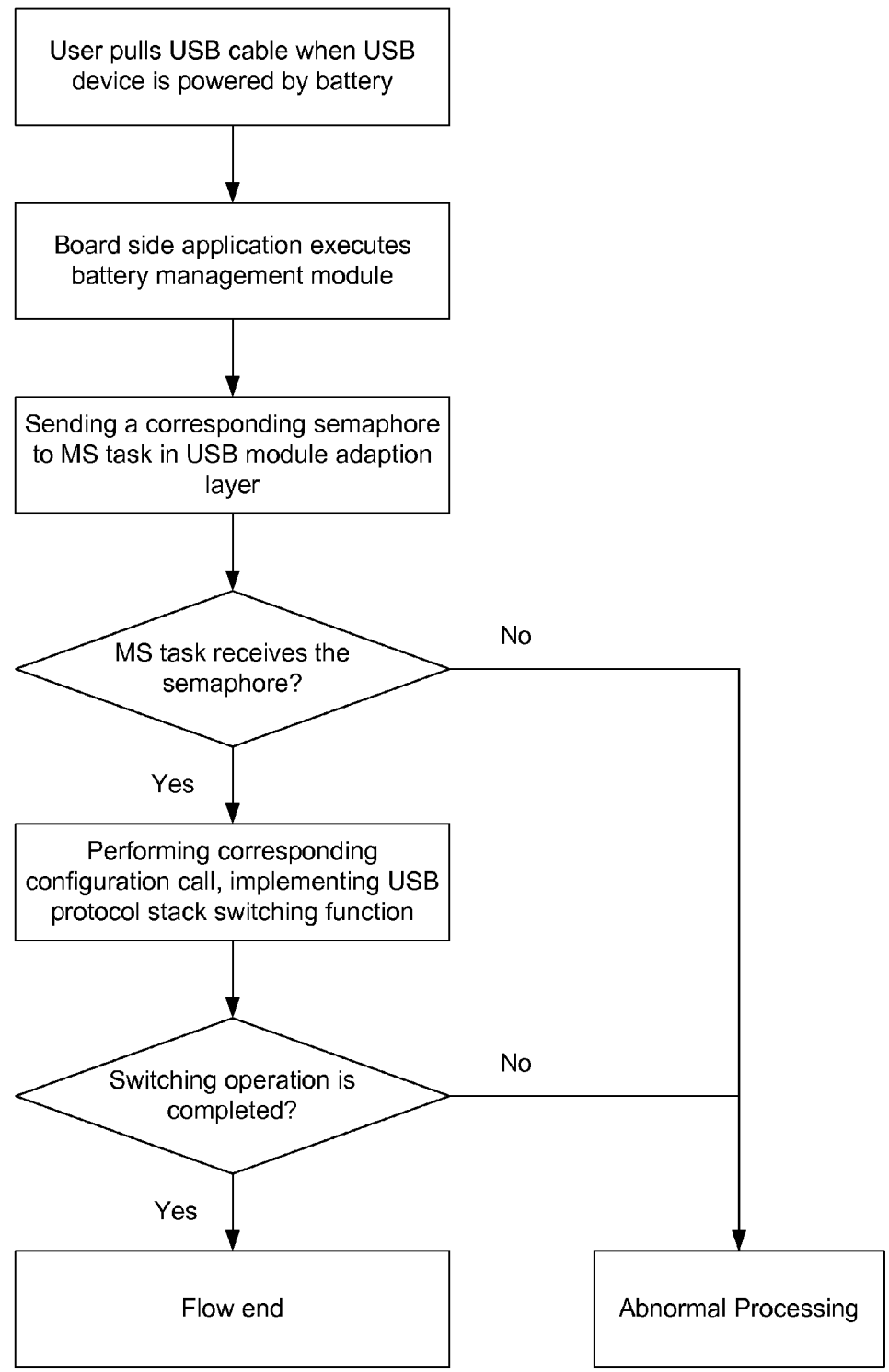
FIG. 2 is a flow chart showing port switching of the USB device from a compound device performed after the USB cable is pulled according to embodiment one of the disclosure.

In the embodiment, the switching of the operating mode of the USB device, either from the single compact disc mode to the compound device multi-port mode or from the compound device multi-port mode to the single compact disc mode, can be implemented through the USB protocol stack reset function. As shown in FIG. 2, when the user pulls the USB cable to disconnect the USB device in the On state, the process that the device is switched from the compound device multi-port mode back to the single compact disc mode are as follows: when the device detects an interruption that the USB cable is disconnected, a battery management module performs corresponding processing and sends a semaphore to an MS task in a USB adaption layer. The MS task detects various semaphores cyclically, and starts to perform the USB protocol stack reset function upon detection of the semaphore of USB disconnection. When the user plugs the USB device to a PC in which the driver has been installed, the USB device performs the USB protocol stack reset function to switch the USB device from the single compact disc mode to the compound device multi-port mode, such that the USB device and the host device can normally operate. When the USB device is plugged to a PC in which the driver has been installed and it is detected that the PC has installed the driver, a port switching instruction is issued to reset the device and switch the device to the compound device multi-port mode for use by the user. When the filter driver detects that the compact disc PID reported by the USB device is an installed one, it will directly issue an SCSI port switching instruction to reset the device and switch the USB device to the compound device multi-port mode for use by the user.

In an actual application, after the USB device with the battery installed therein is powered on and normally starts up, the device is connected to a PC via a USB cable. If it is not the first time the device is connected to the PC (i.e., the device has the PC side driver installed therein), the PC will directly issue a port switching instruction to the device, and the device will execute a reset operation in response to the instruction. Only in the case the user connects the USB device to the PC via the USB cable and then the USB device is powered on, the reset operation of the USB device would be performed without being observed. However, in this case, the device starts up twice and thus the user may feel that the starting time is relative long. Therefore, through switching the USB device from the single compact disc mode to the compound device multi-port mode by executing the USB protocol stack reset function, it can avoid the device from being reset, thus reducing the starting time and improving user experience.

Regarding the performing by the USB device the USB protocol stack reset function to switch the USB device from the compound device multi-port mode to the single compact disc mode, the process of performing the USB protocol stack reset function includes:

acquiring configuration information of the single compact disc mode;

performing, by a USB controller, a disconnection operation;

disabling and reconfiguring function driver FD and an endpoint EP;

re-initializing the function driver FD and the endpoint EP with new configuration;

performing, by the USB controller, a re-connection operation; and performing a callback function.

Likewise, regarding performing the USB protocol stack reset function to switch the USB device from the single compact disc mode to the compound device multi-port mode, the process of performing the USB protocol stack reset function includes:

acquiring configuration information of the compound device multi-port mode;

performing, by a USB controller, a disconnection operation;

disabling and reconfiguring function driver FD and an endpoint EP;

re-initialize the function driver FD and the endpoint EP with new configuration;

performing, by the USB controller, a re-connection operation; and performing a callback function.

Figure 3:
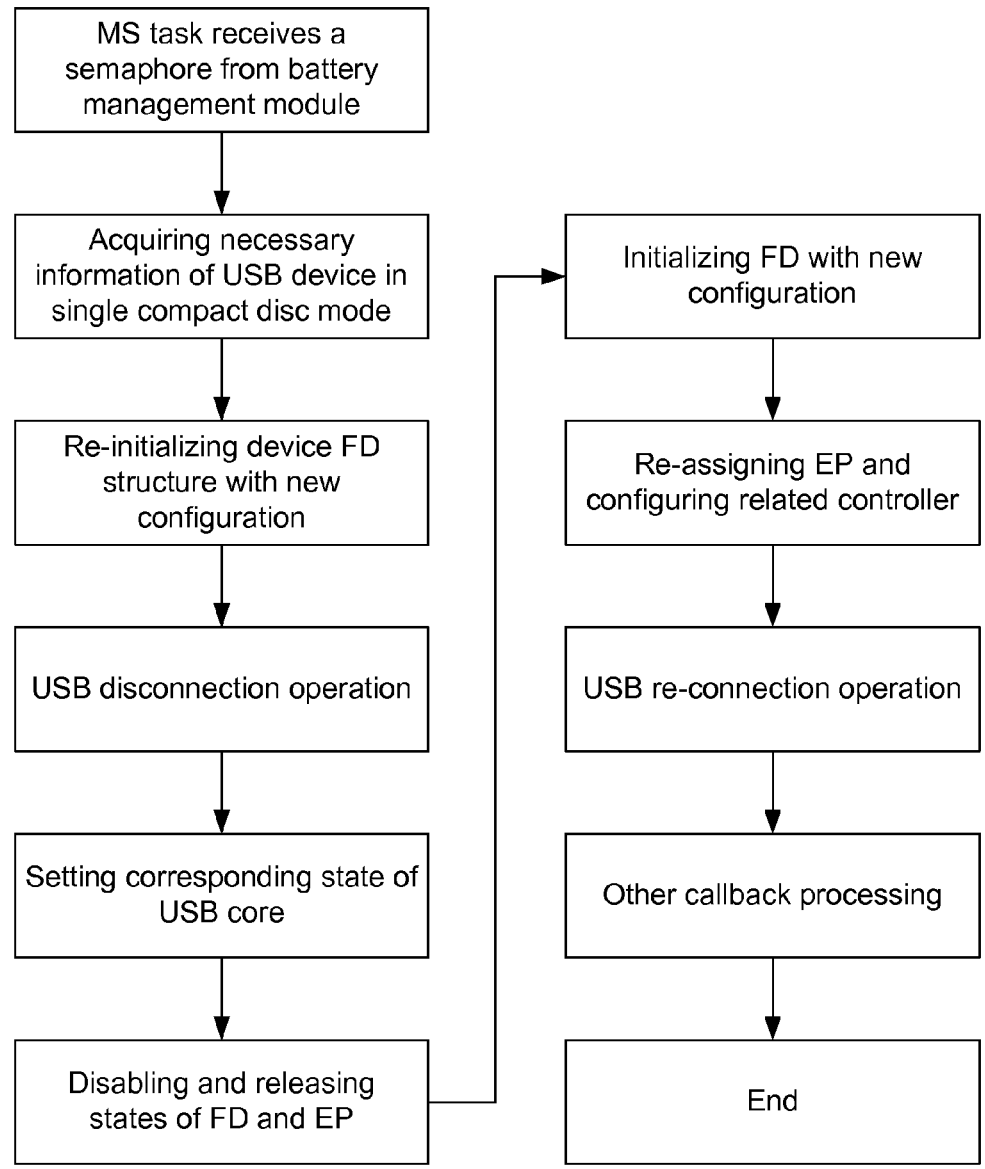
FIG. 3 is a process flow chart of performing USB protocol stack reset according to embodiment one of the disclosure.

Specifically, as shown in FIG. 3, regarding the performing by the USB device the USB protocol stack reset function to switch the USB device from the compound device multi-port mode to the single compact disc mode, the process of performing the USB protocol stack reset function includes:

a Mass Storage (MS) task element receives a semaphore from a battery management module;

acquires necessary information of the single compact disc mode;

disables function driver FD and an endpoint EP, and reconfigures the function driver FD and the endpoint EP to re-initialize the USB device FD and EP structure with the new configuration;

performs the USB disconnection operation;

sets the corresponding state of the USB core;

disables and releases the FD and the state of the EP;

initializes the FD with the new configuration;

re-assigns the EP and configures the related controller;

performs a USB re-connection operation;

performs other callback functions; and end.

During performing the USB protocol stack reset function, it is firstly necessary to read compact disc related information such as VID and PID from the configuration file and store the same in the global variables.

The USB disconnection operation may disconnect the USB device from the PC by modifying content in the USB related register (if the disconnection operation is implemented by the user pulling the USB cable, this step may be omitted).

Various FD (different types of FDs are used to implemented board side functions of different types) structure configuration tasks are performed according to new port combination type, so as to prepare for the subsequent initialization, including Object Exchange (OBEX), Abstract Control Model (ACM), Ethernet Control Model (ECM) and the like.

It comes into the USN adaption layer task command queue and waits for operations related to protocol stack reset to be performed.

Figure 4:
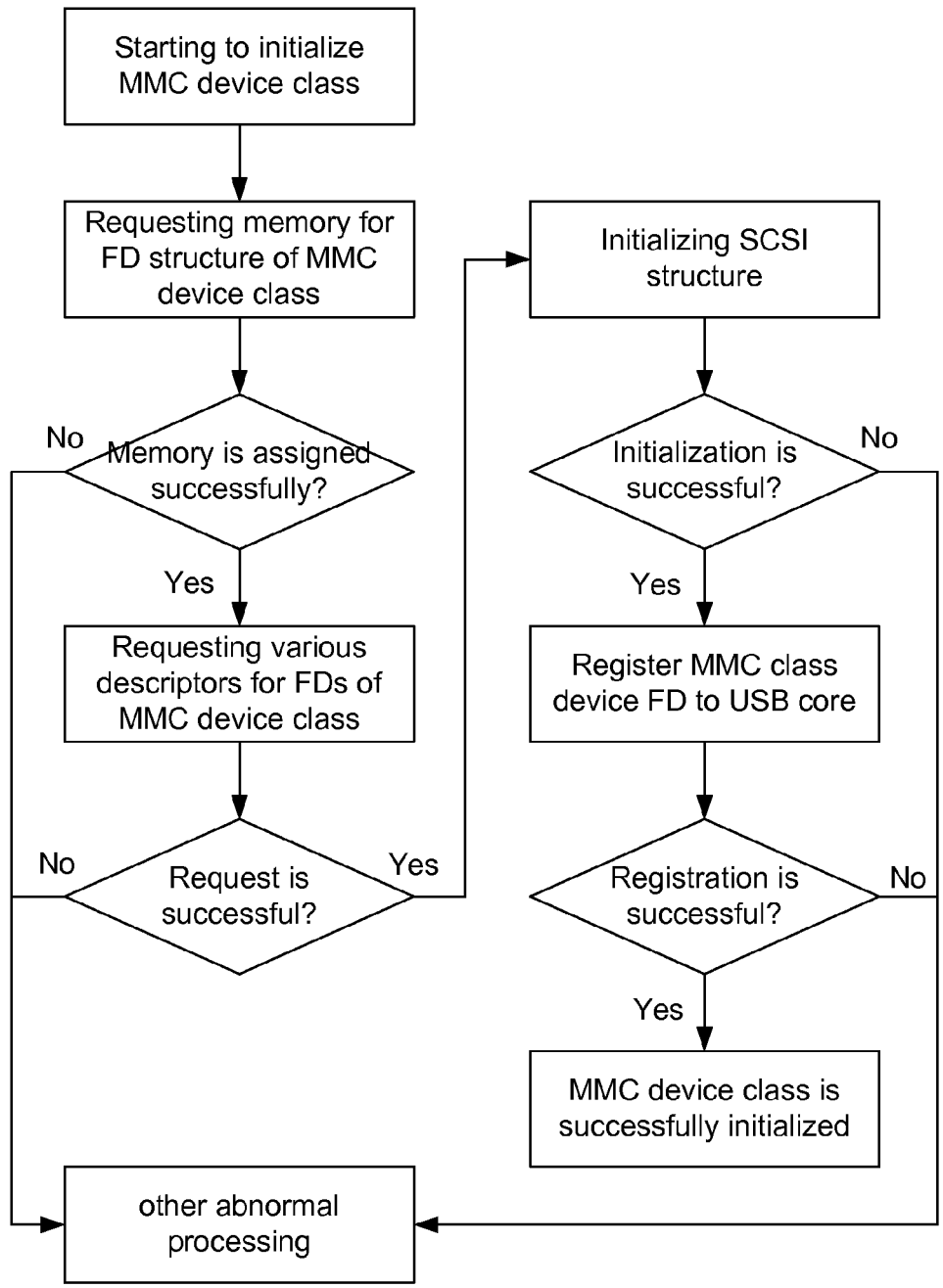
FIG. 4 is a flow chart showing initialization of the USB device according to embodiment one of the disclosure.

An array of USB related descriptors are emptied, FD instances of all the current types are disabled and released (memory and Pipe are released), various types of FD instances are re-initialized in sequence. The specific initialization process may refer to initialization process of the MMC device class, as shown in FIG. 4.

When the configuration operation is completed, the memory space which was previously requested for storing configuration parameters and information is released.

By modifying content of the USB related control register, the USB device is re-connected to the PC or plugged to the PC; and Other callback functions are performed.

During performing the protocol stack reset, for the first time the USB device is switched from the single compact disc mode to the compound device multi-port mode, it is necessary to perform a callback function when performing the protocol stack reset function, and the callback function will open service routines corresponding to the individual ports. The subsequent switching no longer needs any callback function.

Figure 5:
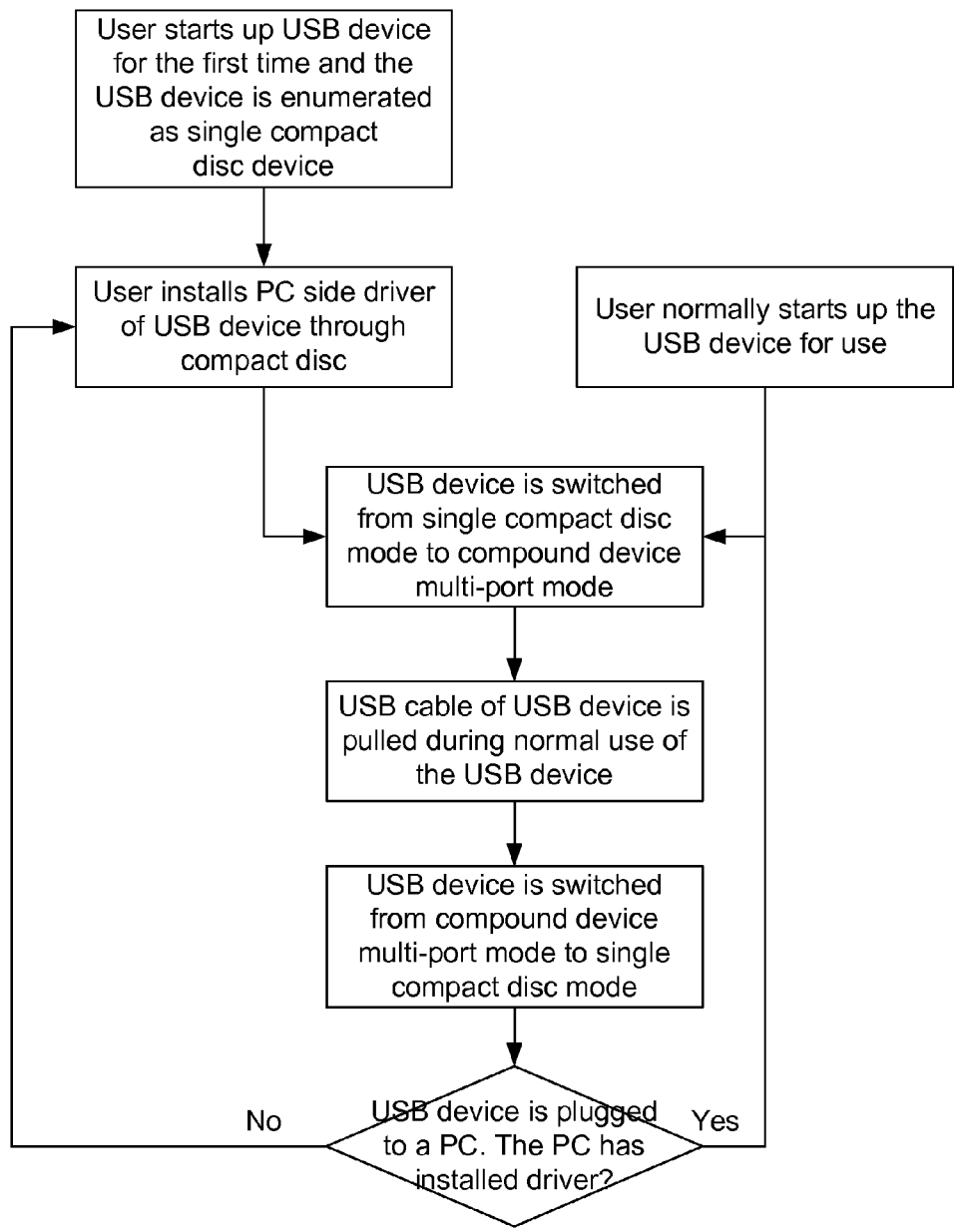
FIG. 5 is a flow chart showing operating of the USB device according to embodiment one of the disclosure.

Based on the above operating mode switching method for the USB device, the USB device can implement the following scenario requirements, as shown in FIG. 5. Generally, whenever the device starts up normally, it reports the single compact disc mode to the PC; when the filter driver sends a port switching instruction to the device or the compact disc pops up in response to a user right click, the device performs ports switching and reports the compound device multi-port mode to the PC. When the user pulls the USB cable, the device is switched from the compound device multi-port mode to the single compact disc mode; and when the USB device is re-connected to the PC via the USB cable, the device reports the single compact disc mode to the PC. If the current PC is one in which the driver has been installed, the filter driver would re-send the port switching instruction, and the device would be switched back to the compound device multi-port mode for normal use by the user. If the current PC does not have the driver installed therein, the user can perform the driver installation by means of the mirror content of the compact disc, and the device is switched back to the compound device multi-port mode after the installation for normal use by the user.

In the embodiment, the USB device may be a wireless terminal product or a Ufi data card product, and the Ufi data card product may be a WiFi-enabled one.

The implementation of the USB protocol stack reset function solves the driver installation in various application environments, thereby improving user experience and market competitiveness of the product.

Embodiment Two

Figure 6:
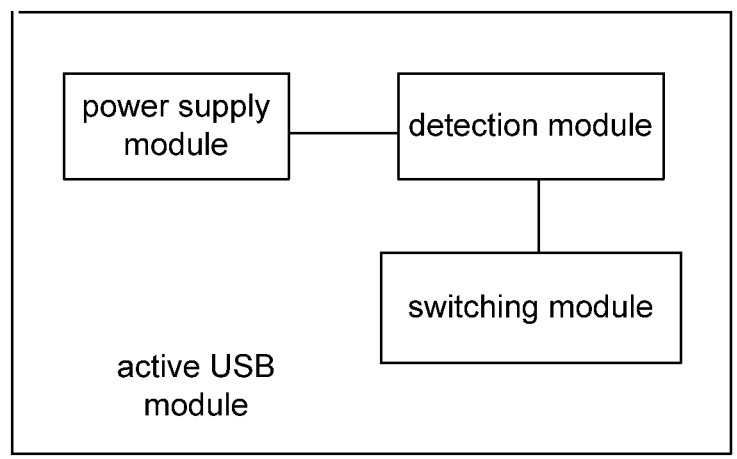
FIG. 6 is a schematic view of the structure of an active USB device according to embodiment two of the disclosure.

Based on the above operating mode switching method for the active USB device, in an embodiment, an active USB device is provided, as shown in FIG. 6. The active USB device includes a power supply module, a detection module and a switching module. The power supply module is configured to power the USB device to keep the USB device in an On state, when the USB device is disconnected from the first host device. The detection module is configured to detect whether the USB device is disconnected from the host device. The switching module is configured to switch the USB device from the compound device multi-port mode to a single compact disc mode, upon detecting disconnection of the USB device from the host device.

The switching process of the USB device may be described as follows.

The power supply module powers the USB device to keep the USB device in an On state, when the USB device is disconnected from the first host device.

Upon detecting that the USB device is disconnected from the host device, the detection module transmits the detection result to the switching module.

The switching module switches the USB device from the previous compound device multi-port mode to the single compact disc mode according to the detection result.

In an embodiment, the detection module in the active USB device is further configured to detect whether the USB device is connected to the first host device or to another host device. The switching module is further configured to judge whether the first host device or the another host device has driver installed therein, when the detection module detects that the USB device is connected to the first host device or the another host device; and switch an operating mode of the USB device from the single compact disc mode to the compound device multi-port mode, when the driver has been installed.

The switching process of the USB device may be described as follows:

the user connects the USB device to a host device which had previously been connected to the USB device or another host device;

the detection module detects that the USB device is connected to a host device which had previously been connected to the USB device or another host device, and transmits the detection result to the switching module; and the switching module determines whether the host device to which the USB device is connected has installed the driver according to the detection result, if so, switches the operating mode of the USB device from the single compact disc mode to the compound device multi-port mode.

The switching module is configured to perform a USB protocol stack reset function to switch the USB device from the compound device multi-port mode to the single compact disc mode.

In an embodiment, the USB device may be a WiFi-enabled data card.

It should be noted that the active USB device may implementing operating mode switching by the USB protocol stack reset function, such that USB devices such as a Ufi data card product may install their respective drivers without distinction and completely in various complicated application environments, which increases user experience and avoids potential bugs from occurring.

The above description is a detailed description of the subject matter in connection with the specific embodiments, and it should not be considered that the specific implementations of the disclosure are limited to the above description. It is apparent to one of ordinary skill in the art that any deduction or alternative without departing from the concept of the disclosure falls within the scope of the disclosure.

The invention claimed is:

1. A method for switching an operating mode of an active Universal Serial Bus (USB) device, comprising:
when the USB devices is connected to a first host device, causing the USB device to be in a compound device multi-port mode;
when the USB device is disconnected from the first host device, keeping the USB device in an On state with power supply; and
switching the USB device from the compound device multi-port mode to a single compact disc mode, upon detecting disconnection of the USB device from the first host device, wherein switching the USB device from the compound device multi-port mode to the single compact disc mode comprises:
performing a USB protocol stack reset function to switch the USB device from the compound device multi-port mode to the single compact disc mode;
wherein performing the USB protocol stack reset function comprises:
acquiring configuration information of the single compact disc mode;
performing, by a USB controller, a disconnection operation;
disabling and reconfiguring a function driver FD and an endpoint EP;
re-initializing the function driver FD and the endpoint EP with new configuration;
performing, by the USB controller, a re-connection operation; and
performing a callback function.

2. The method for switching an operating mode of an active USB device according to claim 1, further comprising:
switching the USB device from the single compact disc mode to the compound device multi-port mode, upon detecting that the USB device is connected to the first host device in which driver has been installed or another host device in which driver has been installed.

3. The method for switching an operating mode of an active USB device according to claim 2, wherein switching the USB device from the single compact disc mode to the compound device multi-port mode comprises:
performing a USB protocol stack reset function to switch the USB device from the single compact disc mode to the compound device multi-port mode.

4. The method for switching an operating mode of an active USB device according to claim 2, wherein switching the USB device from the single compact disc mode to the compound device multi-port mode comprises:
receiving, by the USB device, a port switching instruction from the first host device or another host device; and
resetting the USB device to switch the USB device from the single compact disc mode to the compound device multi-port mode.

5. The method for switching an operating mode of an active USB device according to claim 3, wherein performing a USB protocol stack reset function comprises:

acquiring configuration information of the compound device multi-port mode;
performing, by a USB controller, a disconnection operation;
disabling and reconfiguring a function driver FD and an endpoint EP;
re-initializing the function driver FD and the endpoint EP with new configuration;
performing, by the USB controller, a re-connection operation; and
performing a callback function.

6. An active Universal Serial Bus (USB) device, comprising a power supply module, a detection module and a switching module,
wherein the power supply module is configured to power the USB device to keep the USB device in an On state, when the USB device is disconnected from a first host device;
wherein the detection module is configured to detect whether the USB device is disconnected from the first host device; and
wherein the switching module is configured to switch the USB device from a compound device multi-port mode to a single compact disc mode, upon detecting disconnection of the USB device from the first host device,
wherein the detection module is configured to detect whether the USB device is connected to the first host device or to another host device; and
wherein the switching module is configured to judge whether the first host device or the another host device has a driver installed therein, when the detection module detects that the USB device is connected to the first host device or the another host device; and switch an operating mode of the USB device from the single compact disc mode to the compound device multi-port mode, when the driver has been installed.

7. The active USB device according to claim 6, wherein the switching module is configured to perform a USB protocol stack reset function to switch the USB device from the compound device multi-port mode to the single compact disc mode.

8. The active USB device according to claim 7, wherein the USB device is a WiFi-enabled data card.

* * * * *